(12) United States Patent
Lapikas et al.

(10) Patent No.: US 6,543,973 B2
(45) Date of Patent: Apr. 8, 2003

(54) AUTOMATICALLY RETRACTABLE POSITIONING STOP FOR MACHINING TABLE

(76) Inventors: Joseph W. Lapikas, 2574 Rockfill Rd., Fort Myers, FL (US) 33916; George M. Creamer, 5530 Independence Ct., Ste. #1, Punta Gorda, FL (US) 33982

(*) Notice: Subject to any disclaimer, the term of this patent is extended or adjusted under 35 U.S.C. 154(b) by 0 days.

(21) Appl. No.: 09/952,650

(22) Filed: Sep. 14, 2001

(65) Prior Publication Data

US 2002/0067968 A1 Jun. 6, 2002

Related U.S. Application Data

(60) Provisional application No. 60/233,184, filed on Sep. 15, 2000.

(51) Int. Cl.[7] ............................. B23C 9/00; B23Q 3/02
(52) U.S. Cl. ...................... 409/220; 269/303; 269/317; 408/108; 451/406; 83/468.6
(58) Field of Search ................ 409/220, 218, 409/219; 269/317, 303, 156; 33/613, 645; 83/468.6, 467.1, 468.5, 468.7; 408/108; 72/461; 451/406, 241, 267, 331, 410; 192/125 F, 125 B, 126, 116.5, 138, 139

(56) References Cited

U.S. PATENT DOCUMENTS

| | | | | |
|---|---|---|---|---|
| 2,479,026 A | * | 8/1949 | Schiltz ................... | 192/116.5 |
| 2,685,824 A | * | 8/1954 | Coop ........................ | 269/317 |
| 2,934,040 A | * | 4/1960 | Blatt et al. ................ | 269/320 |
| 2,964,004 A | * | 12/1960 | Carper ...................... | 83/468.5 |
| 3,348,591 A | * | 10/1967 | Carrasco ................... | 83/468.7 |
| 4,793,603 A | * | 12/1988 | Wober et al. ............... | 269/303 |
| 4,967,627 A | * | 11/1990 | Hartmann et al. ......... | 83/468.6 |
| 5,138,772 A | * | 8/1992 | Barnes ...................... | 33/613 |
| 5,702,213 A | * | 12/1997 | Polacek et al. ............ | 409/218 |
| 5,895,184 A | * | 4/1999 | Walters et al. ............. | 409/220 |
| 6,073,529 A | * | 6/2000 | Shibata et al. ............ | 83/468.6 |

\* cited by examiner

*Primary Examiner*—A. L. Wellington
*Assistant Examiner*—Erica E Cadugan
(74) *Attorney, Agent, or Firm*—William E. Noonan

(57) ABSTRACT

An automatically retractable stop mechanism is provided for machine tools. The stop apparatus includes a base that is releasably fixed to the machine tool table. A stop bar is retractably mounted to the base. A spring urges the bar into a retracted condition disengaging the metal part being machined. The spring permits the bar to be selectively actuated to engage the part being machined and properly position that part on the machining table. After positioning is complete, the stop bar is released and the springs automatically retracted so that the machining operation can be performed without interference from the stop apparatus.

10 Claims, 6 Drawing Sheets

AUTOMATICALLY RETRACTABLE POSITIONING STOP FOR MACHINING TABLE

RELATED APPLICATION

This application claims the benefit of U.S. Provisional Patent Application Ser. No. 60/233,184 filed Sep. 15, 2000.

FIELD OF THE INVENTION

This invention relates to an automatically retractable stop apparatus that is used to position metal parts on the table of a conventional machine tool. More particularly, this invention relates to a spring loaded positioning stop that automatically retracts after the part is positioned so that the required machining operation can be successfully performed without damaging or disrupting the machine.

BACKGROUND OF THE INVENTION

CNC milling machines and other widely available machine tools are currently used to perform various operations (e.g. cutting, shaping, drilling, and routing) upon a virtually endless assortment of metal parts or components. Before the machining operation is performed, the part to be machined must be properly positioned and held in place on the machining table. Standard table-top vises are used to hold the part in place; however, before the vise is locked, the part must be accurately positioned within the jaws of the vise. A number of conventional positioning stops are currently used to accomplish this task.

Typically, the positioning stops that are currently available are relatively simple, manually operated devices. The machinist installs the stop at a desired location on the table, sets a plate, arm or other stop component and engages the metal part to be machined against the stop component. The stop must then be disassembled and removed so that the desired machining operation may be completed.

Unfortunately, the known positioning stop devices present serious problems. The machine operator must remember to remove the stop before the machine tool is operated. Otherwise, there is a serious risk that the cutting head or other part performing the machining operation will strike the stop. This is likely to cause serious and expensive damage to the drill, cutter or other machine tool. Valuable time and manpower must then be expended to repair the machine. In many cases, the tool is subjected to extended and very expensive down time. Replacing damaged tools can cost hundreds if not thousands of dollars.

It is not at all uncommon for the machine tool operator to forget to remove the positioning stop. Oftentimes, the machining operation is being performed repetitiously in a tedious manner. Moreover, in CNC applications the machine must be properly programmed by the operator. This can distract the operator's attention from the important task of removing the positioning stop before the cutter or other component is operated. Even when the machinist does remember to remove the positioning stop, this task must be performed manually. In situations were numerous parts must be machined, the positioning stop must be installed and removed for each and every part. This is tends to be an inefficient, time consuming, labor intensive and extremely tedious operation.

SUMMARY OF THE INVENTION

It is therefore an object of this invention to provide a positioning stop for machine tools which is automatically retractable so that the machining operation may be completed quickly and effectively without having to manually remove the positioning stop prior to each such operation.

It is a further object of this invention to provide an automatically retractable positioning stop for machining tables which virtually eliminates the expensive, time consuming and disruptive damage often caused when the positioning stop is inadvertently left in place during the machining operation.

It is a further object of this invention to provide an automatically retractable positioning stop for machining tables which permits metal parts to be positioned on a machining table quickly, conveniently and accurately without requiring the manual assembly and disassembly of the stop between each machining operation.

It is a further object of this invention to provide a positioning stop for machine tools which automatically retracts after a part is positioned on the machining table so that the machining operation may be completed quickly and conveniently without risking potentially expensive damage to the machine tool and resulting repairs, wasted worker time and machine down time.

This invention results from a realization that an automatically retractable positioning stop would enable a machine tool operator to perform his job much quicker and more efficiently because he would no longer be required to disassemble the stop prior to each separate machining operation.

This invention features an automatically retractable positioning stop for machining tables. The stop includes a base that is secured to the machining table at a predetermined position. A retractable stop component is mounted to the base for alternating between retracted and extended positions. Spring means are engaged with the stop component for urging the stop component into the retracted condition and for permitting the stop component to be manually urged into the extended condition. In the extended condition, the part to be machined may be engaged with the stop component and thereby positioned properly on the machining table. In the retracted condition, the stop component is held sufficiently clear of the part to be machined such that the machining operation may be performed without interference from the stop component. After the part to be machined is properly positioned in this manner, that part is locked in a standard table-top vise and the stop component is manually released so that the spring returns the stop component to the retracted condition.

In a preferred embodiment, the stop component includes an elongate stop arm or bar that is pivotably mounted to the base. More particularly, a pivot axle may be rotatably interengaged with a cylindrical bearing in the base. The stop bar may be secured to one end of the pivot axle on a first side of the base and a collar may be secured proximate the second end of the pivot axle on an opposite second side of the base. The base may include an interior annular race or recess that interengages the collar. The race may be disposed about the interior bearing of the base. A first spring retaining element may be mounted to the base within the race and a second spring retaining element may be mounted to the collar and extend within the race. The spring means may comprise a helical compression spring that is formed between the first and second spring retaining elements within the race. Alternatively, the spring may be received in an interior race or chamber within the collar.

An annular groove may be formed within the side of the base opposite the side that includes the spring retaining race.

A first limit pin may be mounted within the base and positioned within the annular groove. The pivot axle may include on the first side of the base a drum that is interconnected to the stop bar. Second and third limit pins may be mounted within to the drum and extend within the annular groove. In the retracted condition, the spring urges the pivot axle to rotate within the central bearing of the base such that the stop bar is pivoted away from the part to be machined. In this position, a first one of the limit pins carried by the drum interengages the limit pin mounted to the base. Alternatively, when the pivot arm is rotated into the extended condition, the spring is compressed between these spring retaining elements in the race. At the same time, the second limit pin carried by the drum engages the limit pin fixed to the base. This limits pivoting of the stop arm into the extended condition. The stop bar is then held in this position until the part to be machined is properly positioned against the stop bar.

DETAILED DESCRIPTION OF PREFERRED EMBODIMENTS

Other objects, features and advantages will occur from the following description of a preferred embodiment and the accompanying drawings, in which.

Figure 1:
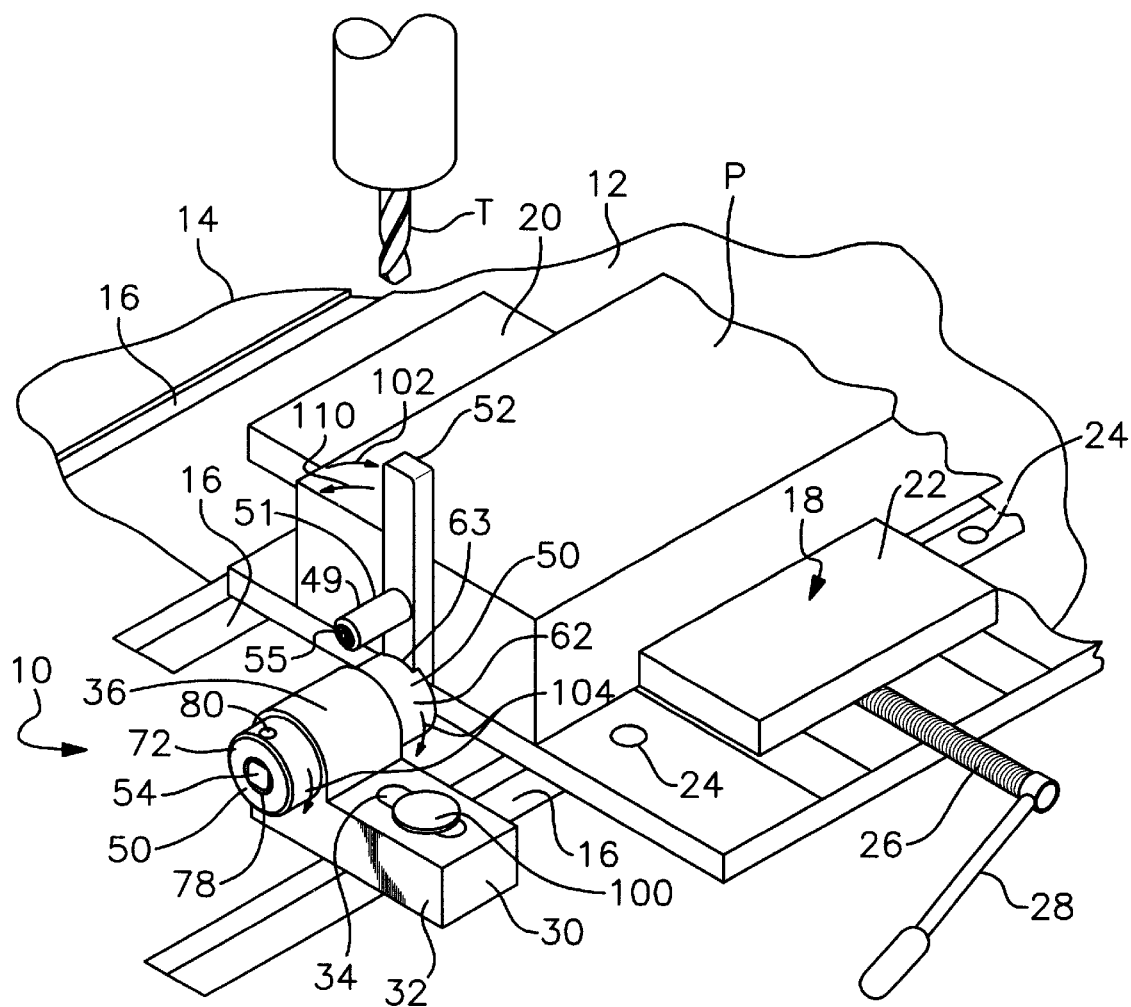
FIG. 1 is a perspective view of a preferred automatically retractable stop apparatus according to this invention mounted on a machine tool table and interengaged with a part to be machined.

There is shown in FIG. 1 an automatically retractable stop apparatus that is operably mounted to the platform or table-top 12 of a conventional machine tool 14. The machine tool may comprise any one of a variety of tools for milling, cutting, stamping, drilling or routing metal parts. Apparatus 10 is particularly effective for use with CNC machines and similar types of machine tools.

In the embodiment shown in FIG. 1, table-top 12 includes a plurality of elongate slots, channels or grooves 16 that are formed into the table-top. The grooves permit a standard machine tool vise assembly 18 to be mounted to the table-top. Vise assembly 18 comprises a pair of jaws 20 and 22 and a vise table 23 that are positioned on the machining table in a conventional manner designed to hold a metal part P, which is to be machined. The slots 16 are interengaged by bolts 24, two of which are shown, in order to secure the vise assembly 18 to table-top 12. An elongate screw element 26 is turned axially rotatably by a vise handle 28 so that the jaws 20 and 22 may be selectively opened and closed relative to one another, as required. The construction of the vise assembly is conventional and does not comprise a part of this invention. Various known techniques and structure may be employed.

According to the prior art, the metal part P to be machined is conventionally placed on table-top 12 (and more particularly onto vise table 23) beneath the drilling, milling or cutting tool T. Until now, a variety of known stop mechanisms have been employed to properly position part P between the jaws 20 and 22 of vise 18. The part is properly positioned by abutting the part against the stop. The jaws of the device are then closed by turning the handle 28. The machinist or tool operator then removes the stop so that it does not interfere with the cutting tool during operation of the machine. If the tool is a CNC machine, it is properly programmed and then operated to mill, cut, drill, rout or otherwise perform a desired operation on the metal part.

Unfortunately, as previously described, the machine tool operator often forgets to retract or otherwise remove the stop element from the vicinity of the metal part and the component T. As a result, during the operation of the machine tool, the cutter or other element performing the operation may inadvertently strike the stop and cause serious damage to the cutting tool.

Figure 2:
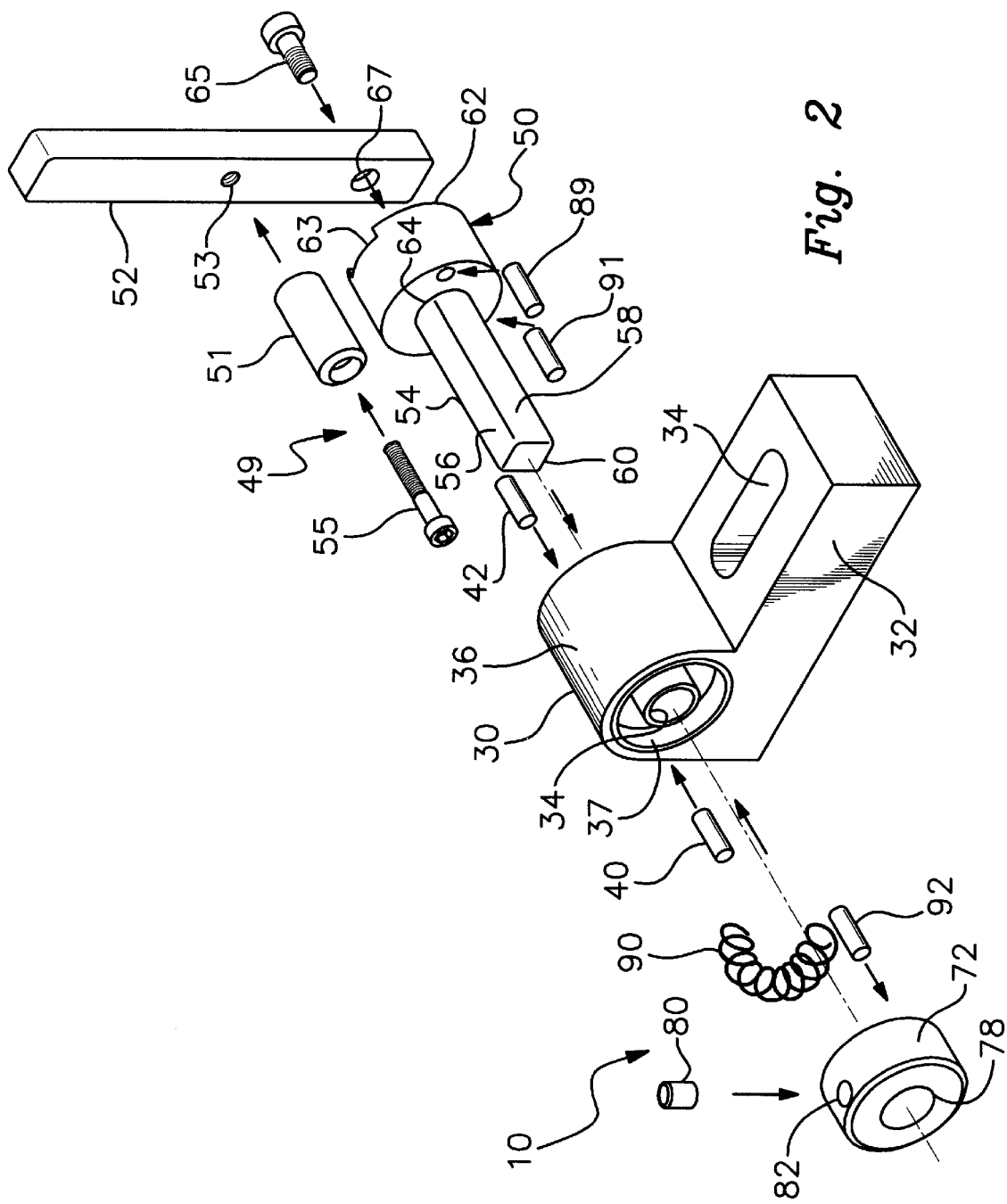
FIG. 2 is an exploded perspective view of the stop apparatus.
Figure 3:
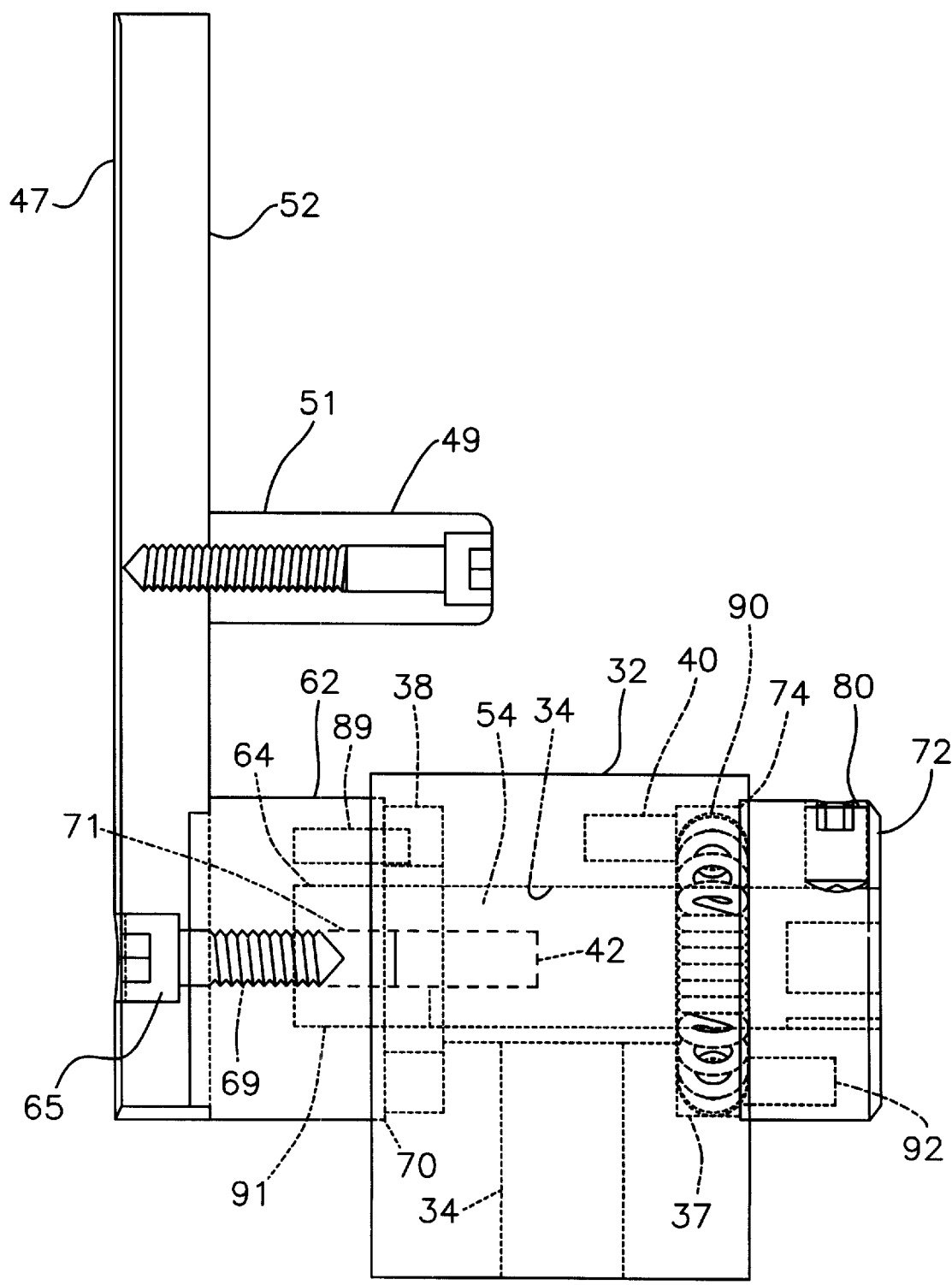
FIG. 3 is an elevational end view of the stop apparatus with the stop bar in an extended operational position.

Apparatus 10 replaces the stop mechanisms used to date and provides significantly improved results. The stop apparatus, which is shown in exploded condition in FIG. 2, includes a base 30 that is composed of aluminum or some other high strength but relatively lightweight metal or metal alloy. The base includes a generally rectilinear foot or extension 32 that has a slot 34 extending generally longitudinally therein. Slot 34 extends from the bottom to the top of foot 32. Base 30 also includes a bearing portion 36 that is attached integrally to and proximate one end of foot 32. As best shown in FIG. 2 and 3, bearing portion 36 includes a central bore 34 that is surrounded at one end by an annular race or recess 37 formed in one side of base 30. A second annular recess or groove 38, obscured in FIG. 2 but shown in FIG. 3, is formed about the opposite end of central bore 34 in the opposite side of base 30.

Figure 6:
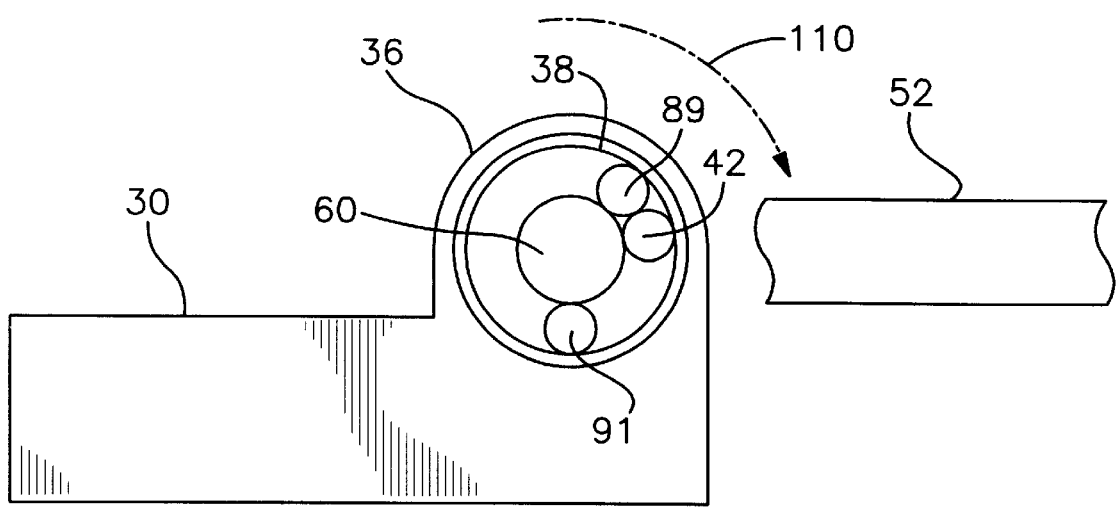
FIG. 6 is an elevational view of the opposite side of the stop apparatus with the cap of the pivot axle removed to illustrate the interengagement between the movement limiting dowel pins; the apparatus is illustrated in the retracted condition.
Figure 7:
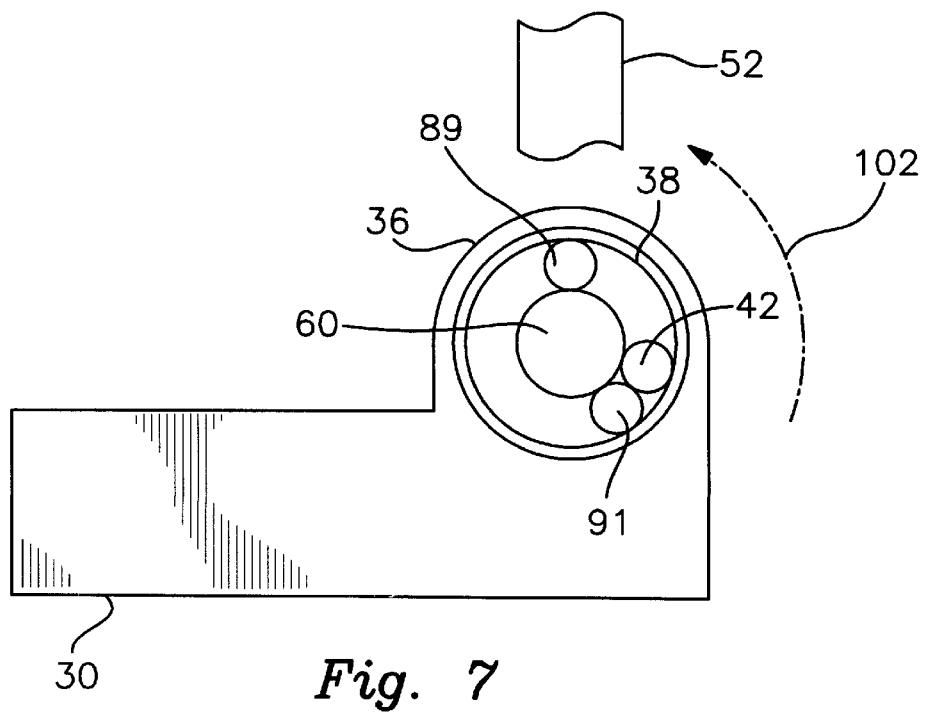
FIG. 7 is a view similar to FIG. 6 but illustrating the apparatus with the stop bar in the extended, operational condition.

Bearing portion 36 of base 30 carries a pair of dowel pins 40 and 42 that are permanently fixed within respective annular recesses of the base. Specifically, a first dowel pin 40 is mounted to the base such that the pin extends across recess 37 at a position located at approximately 12 o'clock within the recess. See FIGS. 3–5. A second dowel pin 42 is fixed to base 30 and extends outwardly into annular recess 38, as best shown in FIGS. 3, 6 and 7. These dowel pins define the limits of operation of the stop apparatus as is described more fully below.

As shown in FIG. 1, a pivot axle 50 is axially rotatably mounted to bearing portion 36 of base 30. An elongate stop bar 52 having a convex outer surface 47, FIG. 3, is secured proximate one end of pivot axle 50. Bar 52 has a longitudinal axis that extends radially relative to pivot axle 50. Cap 62 includes a radial notch 63, FIGS. 1 and 2, that receives stop bar 52. A locking bolt 65 is inserted through a corresponding hole 67 in bar 52 and is threadably engaged with a corresponding central hole 69 formed in cap 62. As shown in FIG. 3, the distal end of bolt 65 is received in a threaded opening 71 in the end of the shaft 54 received by cap 62. This interconnection fastens the stop bar 52 to pivot axle 50 and fixedly interconnects cap 62 and shaft 54 so that they rotate axially in unison. The stop bar is preferably composed of stainless steel or a similar material.

A stop bar actuating handle 49 is attached to and extends transversely from the stop bar. As shown in FIGS. 1–3, handle 49 comprises a generally tubular component 51 that is aligned with a hole 53 in stop bar 52. The tubular component is preferably composed of aluminum of a similar material. A cap screw or bolt 55 is received through the axial opening of tubular component 51 and is threadably engaged with opening 53 in stop bar 52. The threaded cap screw 55 is tightened to form the completed handle, best shown in FIGS. 1 and 3.

As illustrated shown in FIG. 2, pivot axle 50 comprises an elongate shaft 54 that includes a pair of flat surfaces 56 and 58 interconnected to one another at an angle of approximately 90°. A rounded corner surface 60 extends between the flat surfaces 56 and 58. A generally annular cap 62 is attached to a first end of shaft 56. More specifically, as shown in FIGS. 2 and 3, cap 62 includes a central opening 64 that receives shaft 54. Cap 62 may be seated flush with the outer surface of bearing portion 36 or, alternatively, may be received in an annular notch 70 formed in the base generally surrounding recess 38 (see FIG. 3).

Shaft 54 extends through the central opening 34 of bearing portion 36. The distal end of shaft 54 is received by an annular collar 72, FIGS. 1–3, which is itself engaged with a notch 74 formed in the side of body 30 surrounding annular recess 37. The distal end of shaft 54 is received by central opening 78 of collar 72. A set screw 80 is received through a complimentary opening 82 in collar 72. The set screw may be tightened to bear against flat surface 56 of shaft 54. This locks the shaft within collar 72. Because collar 72 is locked onto shaft 54, the collar is rotatable in unison with the pivot axle 30 and attached stop bar 52.

Several additional dowel pins are carried by cap 62 and collar 72. Specifically, dowel pins 89 and 91, FIGS. 2, 6 and 7, are secured to cap 62 such that they extend transversely into annular recess 38 of base 30. Likewise, a dowel pin 92, FIGS. 2–5, is mounted to collar 72 such that when the stop apparatus is fully assembled, dowel pin 92 extends transversely across annular recess 37.

A helical compression spring 90 is mounted within annular recess 37 such that it extends between the dowel pin 40 fixed to body 30 and the dowel pin 92 attached to collar 72. See FIGS. 3–5. In its relaxed, expanded condition, spring 90 urges pin 92 into the position shown in FIG. 4 such that the spring extends through an angle of approximately 270° within recess 36. Alternatively, in the compressed condition shown in FIG. 5, spring 90 extends through an angle of approximately 180° within recess 36.

Figure 4:
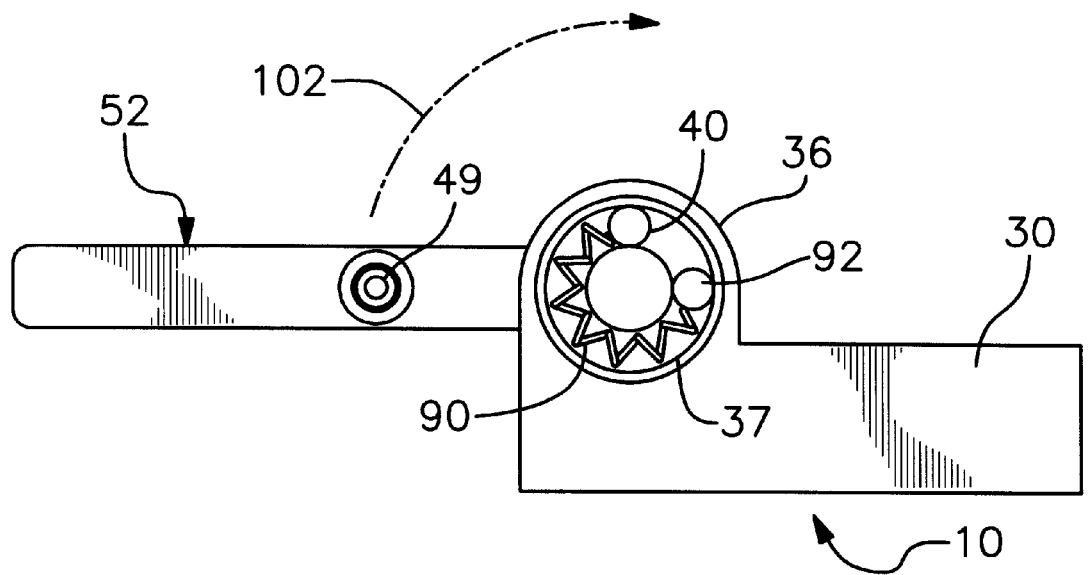
FIG. 4 is an elevational side view of the stop apparatus in its retracted condition; the collar is removed to illustrate the retracting spring used by the apparatus.

The foregoing structure permits stop bar 52 to be pivoted between the extreme positions shown in FIGS. 4, 6 and FIGS. 5, 7, respectively. Specifically, when apparatus 10 is not being used, stop bar 52 is retracted and held as shown in FIGS. 4 and 6. Spring 90 biases dowel pin 92 and attached collar 72 (FIG. 2) into the retracted position shown in FIG. 4 so that pivot axle 50 is rotated to hold stop bar 52 in a generally horizontal position.

Figure 5:
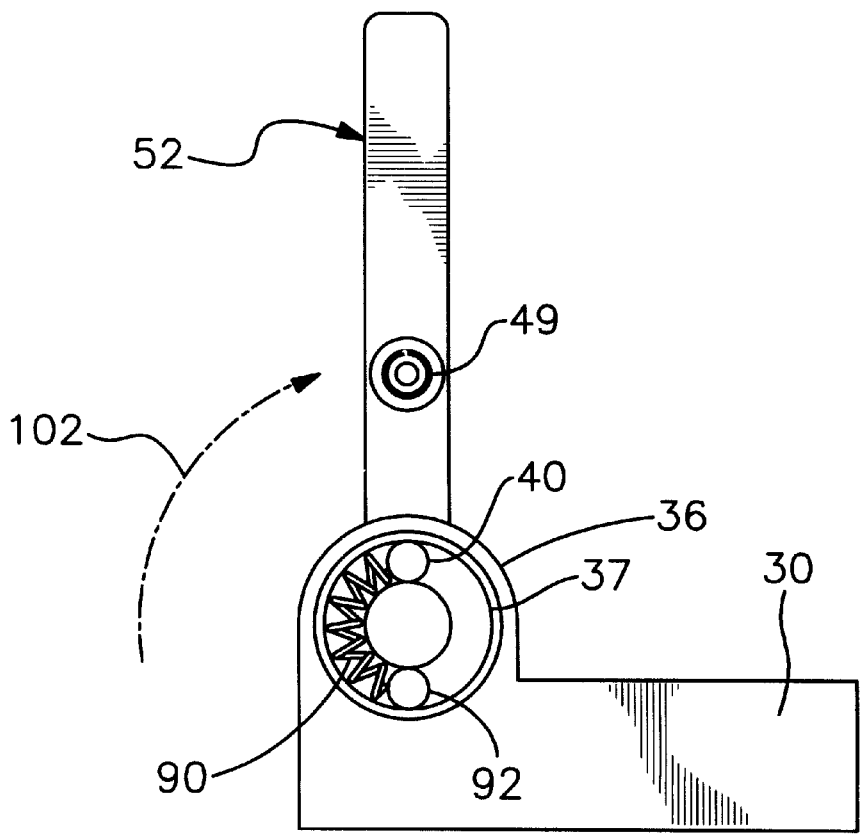
FIG. 5 is a view similar to FIG. 4 of the stop apparatus with the stop bar in its extended, operational condition.

Alternatively, the operator may grasp stop bar handle 49 and rotate the stop bar about pivot axle 50 and into the vertical condition shown in FIGS. 5 and 7. In this condition, spring 90 is compressed between fixed dowel pin 40 and movable dowel pin 92 attached to the rotating collar 72.

In operation, one or more stops 10 are mounted to table-top 12 in the manner shown in FIG. 1. Each stop apparatus is secured to the table by inserting a mounting bolt or bracket 100 through slot 34 in foot 32 and interengaging that bolt or mounting component with a corresponding slot 16 in table-top 12. Each stop apparatus is positioned as required on the table-top. Initially, before the metal part P is placed on the table, the stop apparatus is maintained in a retracted condition. The natural bias of spring 90 urges the pivot axle 50 to rotate stop bar 52 into a horizontal position as shown and as previously described in connection with FIG. 4. In this position the bar is slightly below the upper surface of vise table 23 (see FIG. 1).

To position part P on table top 14, the machinist or other machine tool operator operates apparatus 10 by grasping handle 49 and pivoting stop bar 52 about pivot axle 50 in the manner indicated by arrow 102 in FIGS. 1, 4 and 5. The pivot axle and attached collar 72 rotate as indicated by arrows 104 in FIG. 1. This causes the spring 90 to be compressed as shown in FIG. 5.

Rotation of the pivot axle and pivoting of the stop bar are limited to a 90° range of movement by the dowel pins 42, 89 and 91 located on the opposite sides of base 30. The operation of these pins is best shown in FIGS. 6 and 7. When the stop apparatus is in its retracted condition, FIG. 6, stop bar 52 maintains a generally horizontal orientation. As previously described, spring 90 on the opposite side of the apparatus extends through an angle of 270° within its respective recess. At that this position, dowel pin 89 engages fixed dowel pin 42 whereas dowel pin 91 is spaced approximately 90° from dowel pin 42. The interengaged pins 89 and 42 effectively hold bar 52 horizontally and prevent the bar from rotating downwardly any farther in the direction of arrow 110.

When bar 52 is pivoted upwardly into its extended, generally vertical position, FIG. 7, the pivot axle 50, FIG. 2 and attached dowel pins 89 and 91 are rotated into the position shown therein. Dowel pin 91 engages and is stopped by fixed dowel pin 42; and dowel pin 89 is spaced approximately 90° apart from pin 42. As a result, rotation of pivot axle 50 and pivoting of bar 52 in the direction of arrow 102 are limited by the interengaged pins 42 and 91.

With bar 52 in the vertical position, metal part P is manipulated on the vise table 23 until it interengages the concave surface 47 of raised stop bar 52. After the metal part P is properly positioned against stop bar 52, as shown in FIG. 1, the operator releases handle 49 and permits the stop bar to retract automatically into its initial, generally horizontal position. When the operator releases handle 49, spring 90 urges pivot axle 50 and attached bar 52 to rotate downwardly in the direction indicated by arrow 110 in FIG. 1. The stop bar thereby disengages part P and returns automatically to a horizontal position. The machinist then tightens the metal parts between the jaws 20 and 22 of vise assembly 18. The machine tool is programmed and operated as required so that tool T performs the desired operation (e.g. cutting, milling, drilling, routing, etc.) upon part P. While this operation is being performed, stop bar 52 is positioned safely out of the way so that it does not interfere with or potentially damage tool T. The stop bar retracts automatically when the operator releases handle 49. The operator does not have to remember to manually retract or remove the stop bar. This not only saves time, but avoids the possibility of expensive and disruptive damage being caused to the machine if the machinists inadvertently forgets to retract or remove the stop bar. A desired machining operation may be performed on any surface of the part, including the surface previously engaged by the stop bar, without interference from the bar.

The concave outer surface 47 of stop bar 52 effectively engages metal parts having various configurations and permits the stop bar to drop conveniently away from the part when the user releases handle 49. A flat, flush or square face on the stop bar would tend to cause the stop bar to jam against certain metal components being machined, especially components having angled surfaces abutting the stop apparatus.

Although stop bar 52 is depicted on the right-hand side of apparatus 10 in the versions previously described, in alternative embodiments, the stop bar may be switched to the left-hand side of base 30. This is accomplished by loosening set screw 82 (FIG. 2) and removing collar 72 from annular recess 37. Pivot axle 50 is removed from bearing 34. Spring 90 is removed from recess 37. Pivot axle 50 is reversed and shaft 52 is inserted through bearing 34 on the opposite side of body 30 such that cap 62 engages recess 37. Spring 90 is inserted into groove 38 on the opposite side of body 30. Collar 72 is then engaged with recess 38 such that central opening 78 receives shaft 54. Set screw 80 is replaced in collar opening 82 and the set screw is tightened. As a result, the stop bar 52 is located on the opposite side of the body from that which is shown in the previous drawings. It should be noted that the previously described dowel pin arrangement is reversed in this version. In particular, three dowel pins 89, 91 and 40 are located in recess 37; whereas, two dowel pins 42 and 92 are located in groove 38 at opposite ends of spring 90.

Figure 8:
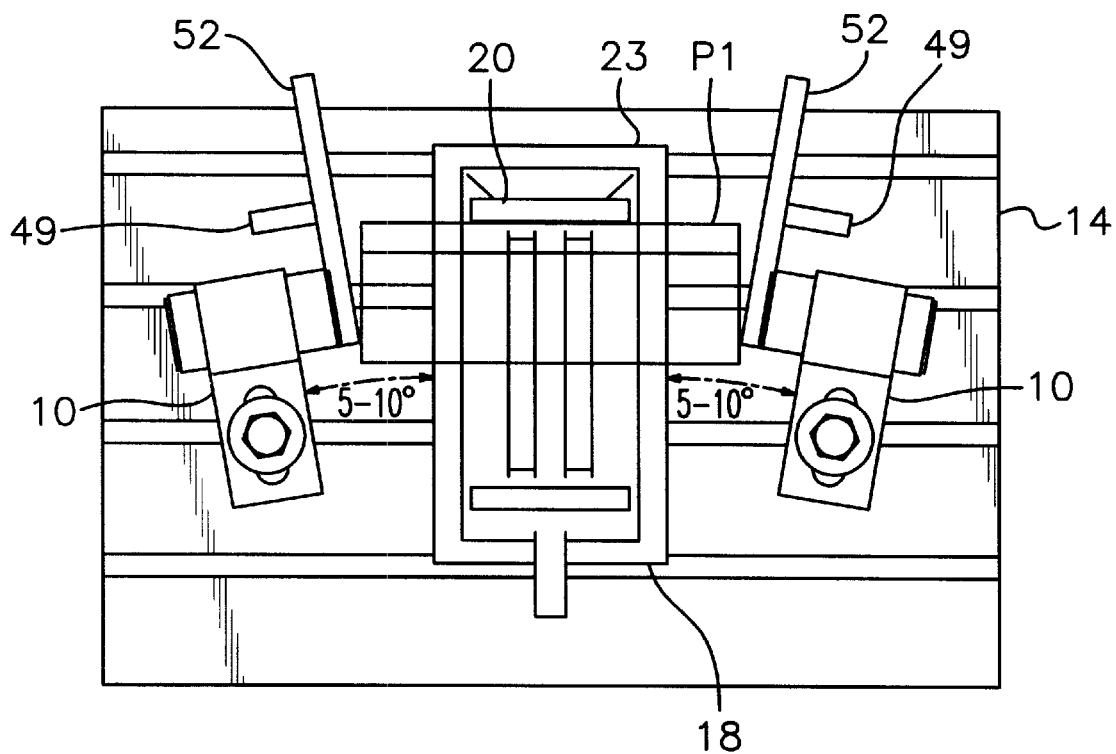
FIG. 8 is a plan view of a pair of opposing stop mechanisms positioned on a machine table-top on respective sides of a clamp vise.

In FIG. 8 a pair of opposing stop devices 10 are mounted on a machine table 14 on opposite sides of a vise table 23. In this embodiment, each apparatus is oriented such that the stop bar 52 extends at an angle of 5°–10° degrees relative to the axis of the vise. Each apparatus 10 is constructed and operates in a manner analogous to the apparatus previously described.

To properly position a part on table 14 using devices 10, the arm 52 of a selected one of the devices is raised by grasping appropriate handle 49 and pivoting the stop bar upwardly. The machine operator then slides part P1 along jaw 20 until the part engages the raised stop bar. This indicates that the proper position is obtained. The operator then releases the stop bar and it returns to its horizontal position below and disengaged from part P1. While releasing the stop bar, the operator holds part P1 steady. Finally, with the stop bar in its retracted condition, the operator clamps the vise closed on part P1. The machine operation is then performed on the part.

The stop bar of this invention is extremely simply and convenient to operate. The apparatus may be adjusted and positioned on a wide variety of machine tool tables. The invention helps the user to avoid expensive and extremely inconvenient machine down time and significantly reduces machine tool repair costs.

It should be understood that the automatically retractable stop of this invention may employ a wide variety of alternative spring loaded retracting devices. For example, the stop arm may operate other than rotatably. In certain versions, a telescopically retractable stop arm may be used. It should also be understood that various types of spring mechanisms may be employed within the scope of this invention. For example, spiral or "watch spring" type springs may be utilized.

From the foregoing it may be seen that the apparatus of this invention provides for an automatically retractable stop apparatus that is used to quickly and effectively position metal parts on the table of a conventional machine tool. While this detailed description as set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims.

What is claimed is:

1. An automatically retractable stop apparatus for positioning a part to be machined on a machine platform, which platform carries a vise for holding the part in place on the platform, said stop apparatus comprising:
    a base that is attachable to a selected location on the machine platform;
    a retractable stop component pivotably mounted to the base via attachment to a pivot axle that is rotatably interengaged with a bearing in said base for alternating between an extended position where said stop component is engageable by the part to position the part on the platform, and a retracted condition wherein the stop component is disengaged from the part such that the part may be machined without interference from said stop component; and
    a spring interconnected between said base and said stop component for urging said stop component into said retracted position and permitting said stop component to be urged manually into said extended position.

2. The apparatus of claim 1 in which said stop component includes an elongate bar.

3. The apparatus of claim 1 in which said bearing is cylindrical.

4. The apparatus of claim 3 in which said base includes an annular groove, said base further carrying a first limit member that is positioned within said annular groove.

5. The apparatus of claim 4 in which said pivot axle includes a drum that is interconnected to said stop component.

6. The apparatus of claim 5 further including a pair of second and third limit members mounted to the drum and extending within said annular groove for engaging said first limit member and limiting the range of pivoting of said pivot axle relative to said base.

7. The apparatus of claim 3 in which said stop component is disposed on a first side of said base and further including a collar secured proximate an opposite end of said pivot axle on an opposite, second side of said base.

8. The apparatus of claim 1 in which said base includes an interior annular recess for accommodating said spring.

9. The apparatus of claim 8 in which said spring includes a helical compression spring disposed within said recess.

10. The apparatus of claim 9 further including first and second spring retaining elements mounted in said recess, said spring extending between said first and second spring retaining elements.

* * * * *